Dec. 11, 1934.                H. O. MILLS                1,984,195

PISTON SKIRT EXPANDER

Filed Nov. 3, 1932

Inventor
Harold O. Mills
by Townsend S. Beaman
Attorney

Patented Dec. 11, 1934

1,984,195

UNITED STATES PATENT OFFICE 1,984,195

PISTON SKIRT EXPANDER

Harold O. Mills, Jackson, Mich.

Application November 3, 1932, Serial No. 641,004

5 Claims. (Cl. 309—12)

The present invention relates to improvements in internal combustion engines and the primary object is to provide a simple, inexpensive and readily installable expander for skirts of the pistons to avoid the necessity of installing oversize pistons to remove "piston slapping" where the cylinder walls have become worn or new pistons where the old pistons have become worn.

At the present there are several skirt expanders being employed but in every instance it is necessary to remove the piston from the engine block and machine the piston in some manner in order to adapt the expander to the piston.

Thus it becomes one of the objects of my invention to provide an expander ring for piston skirts which may be installed in the majority of the various types of pistons being employed without removing or machining the piston in any manner.

Another object of my invention is to provide an expander ring which may be adapted to any type of split skirt piston by a simple machining operation without the requirement of special tools.

These and other objects and advantages will appear as the description proceeds. It is to be distinctly understood, however, that I do not wish to be limited to the exact details herein disclosed and described, but intend to include as part of my invention all such changes and modifications as would occur to those skilled in the art and fall within the scope of the appended claims.

Figure 1:
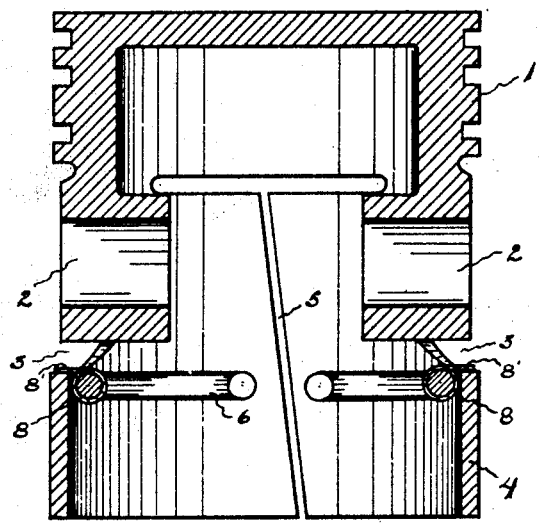

In the accompanying drawing wherein is disclosed one of the preferred forms which my invention may take for the purpose of illustration, Fig. 1 is a cross sectional view through a split skirt piston with my improved expander ring in position.

Figure 2:
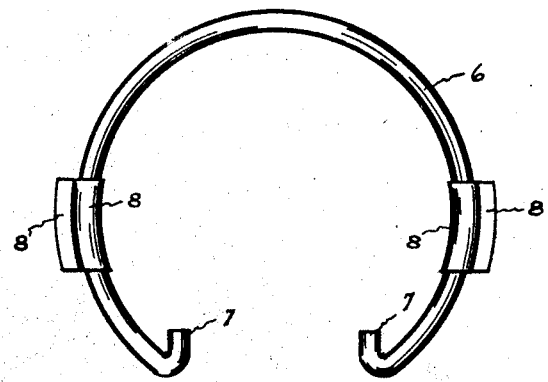

Fig. 2 is a plan view of my improved expander ring.

Having reference to the drawing, a split skirt piston 1 of usual construction having bearings 2 in which the usual wrist pin (not shown) is received. The bearings 2 are constituted in the nature of bosses resulting in the provision of horizontal slots 3 opening through the skirt 4 of the piston. The skirt 4 is shown split at 5.

The structure this far described is of common and well known construction. In Fig. 2, my improved expander ring especially adapted for insertion in piston of the above described type, consists of an annular resilient member 6 preferably in the form of spring wire. The opposing ends of the members 6 are illustrated as being deflected inwardly to provide shoulders 7 which may be readily gripped by pliers or other suitable tool to reduce the diameter of the member 6 to facilitate the insertion into the piston as will be hereinafter more fully described.

In order that the member 6 may be fixedly supported within the piston skirt, and without the present practice of machining a groove on the inside of the piston necessitating the employment of special machinery, clips 8 are secured to the member 6 to provide supporting and anchoring shoulders for the expander ring. The clips 8 as shown are of sheet metal closely conforming to the contour of the member 6 about which they are wrapped. Each clip has a shoulder portion 8' overhanging the member 6 a distance slightly less than the width of the piston skirt 4. As will be readily apparent the curvature of the member 6 will prevent the clips 8 from being pivoted above the same with the result that the clips when properly applied will retain the supporting shoulder 8' in the position shown in Fig. 1. The provision of a relatively thin supporting shoulder 8' above the plane of the expander ring is of considerable importance in view that some types of the piston disclosed the slots 3 are very narrow.

Obviously, clips of a shape other than illustrated may be advantageously employed and it is not my desire to be limited to the exact construction shown. Moreover, the supporting clips may be secured to the member 6 by means other than wrapping, for example, by brazing, welding and the like.

In order to employ my improved expander in the piston not provided with slot 3 or the equivalent, the piston may be removed from the engine block and slot cut through the side of the piston skirt by a hand hack saw which forms part of the equipment of every garage.

In order to install the above described expander ring, the shoulders 7 are deflected toward each other through the use of hand pliers, or the like, to reduce the diameter of the member 6. When the shoulders 8' are in the plane of the receiving slots in the piston, the member 6 is permitted to expand, carrying the shoulder 8' into the slots and bring the outer periphery of member against the inner wall of the skirt 4 to expand the same.

Having thus described my invention, what I claim as new and desire to protect by Letters Patent is:

1. A piston skirt expander comprising an arcuate spring member of arcuate cross section, supporting clips secured to and spaced along said member having transverse overhanging shoulders, a portion of said clips being closely wrapped around said member and extending circumferentially of the same a sufficient distance to resist rotation thereupon, said shoulders being adapted to be supported upon transverse shoulders in the piston and retained in position by the expanding action of the member.

2. A piston skirt expander comprising an arcuate spring member of arcuate cross section, supporting clips secured to and spaced along said member, said clips being closely wrapped around said member and terminating in transverse overhanging shoulders located out of the plane of said member, said clips extending circumferentially of said member a sufficient distance to resist rotation thereupon, said shoulders being adapted to be supported upon transverse shoulders in the piston and retained in position by the expanding action of the member.

3. A piston skirt expander comprising an arcuate spring wire member of arcuate cross section, sheet metal clips secured to and spaced along said member, said clips being closely wrapped around substantially the entire periphery of said member and extending laterally thereof to form overhanging shoulders located out of the plane of said member, said clips extending circumferentially of said member sufficiently to resist rotation thereupon, said shoulders being adapted to be supported upon transverse shoulders in the piston and retained in position by the expanding action of the member.

4. The combination with a piston having a split skirt to permit expansion thereof, opposed slots in said skirt, a spring wire expansion ring located within said skirt expanding the same and supporting clips fixedly secured to said ring, said clips comprising sheet metal portions closely wrapped about said ring for a sufficient length thereof to maintain said clips against rotation and each having a portion integral therewith extending horizontally from the top side of said ring into said slots.

5. The combination with a piston having a split skirt to permit expansion thereof, opposed slots in said skirt having lower edges, said lower edges being in substantially the same plane, a spring wire expansion ring disposed concentrically in said skirt adjacent the plane of said edges and adapted to expand said skirt, and two sheet metal clips secured to said ring adjacent said slots, said clips comprising sheet metal portions closely wrapped about said ring for a sufficient length thereof to maintain said clips against rotation and each clip having a portion integral therewith extending horizontally from the top side of said ring in the plane of said edges into one of said slots.

HAROLD O. MILLS.